(No Model.)  3 Sheets—Sheet 1.
J. W. BROWN, Jr.
MACHINE FOR CUTTING GREEN CORN FROM THE COB.
No. 273,457.  Patented Mar. 6, 1883.
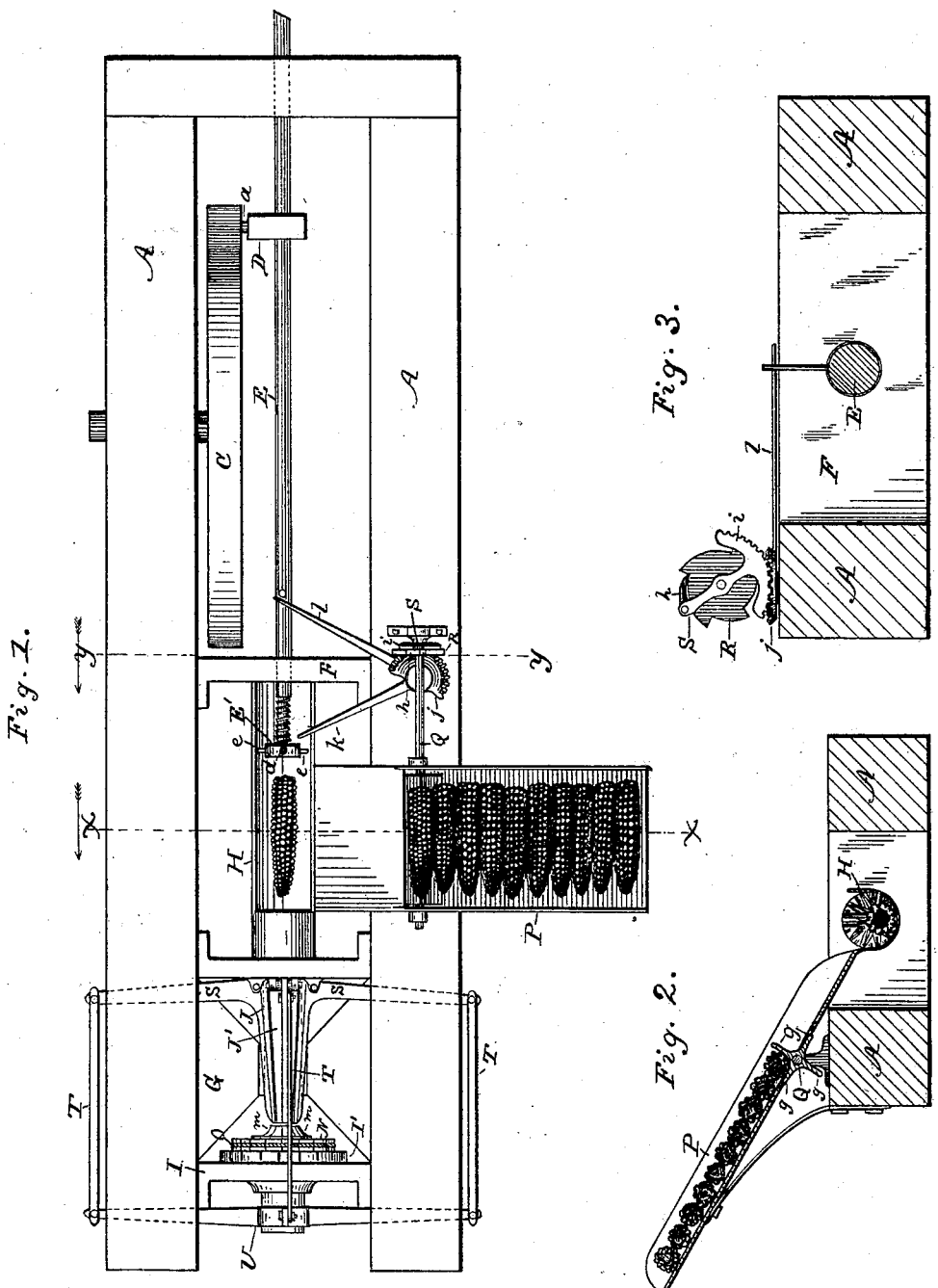
WITNESSES:
Thos. Houghton.
Edw. N. Byrn
INVENTOR:
Jno. Wilson Brown Jr.
BY Meem & Co
ATTORNEYS.

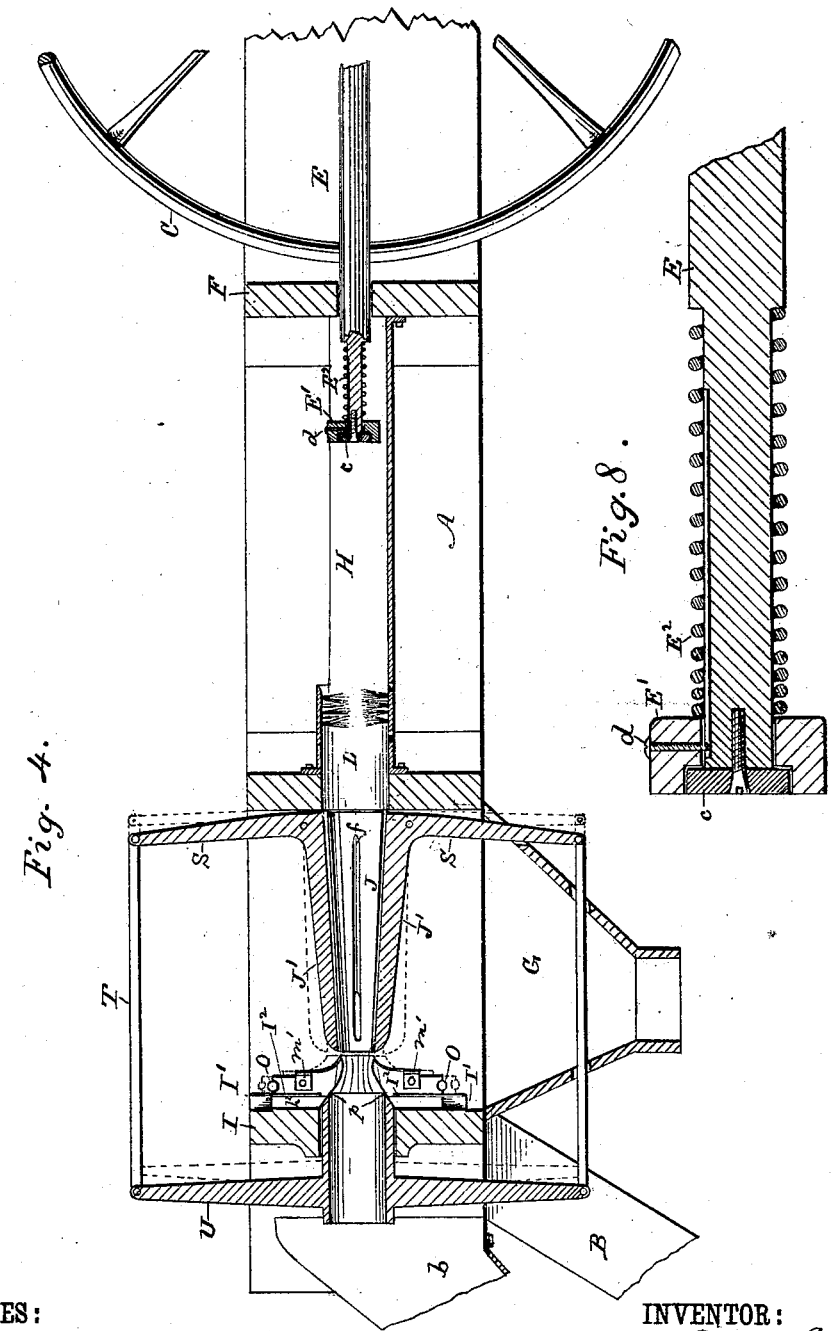

(No Model.)  3 Sheets—Sheet 3.

J. W. BROWN, Jr.
MACHINE FOR CUTTING GREEN CORN FROM THE COB.

No. 273,457.  Patented Mar. 6, 1883.

WITNESSES:
Thos. Houghton.
Edw. W. Byrn

INVENTOR:
Jno. Wilson Brown Jr.
BY
ATTORNEYS.

UNITED STATES PATENT OFFICE.

JOHN WILSON BROWN, JR., OF BALTIMORE, MARYLAND.

MACHINE FOR CUTTING GREEN CORN FROM THE COB.

SPECIFICATION forming part of Letters Patent No. 273,457, dated March 6, 1883.

Application filed October 16, 1882. (No model.)

*To all whom it may concern:*

Be it known that I, JOHN WILSON BROWN, Jr., of Baltimore city, State of Maryland, have invented a new and useful Improvement in Machines for Cutting Green Corn from the Cob; and I do hereby declare that the following is a full, clear, and exact description of the same, reference being had to the accompanying drawings, forming part of this specification, in which—

Figure 5:
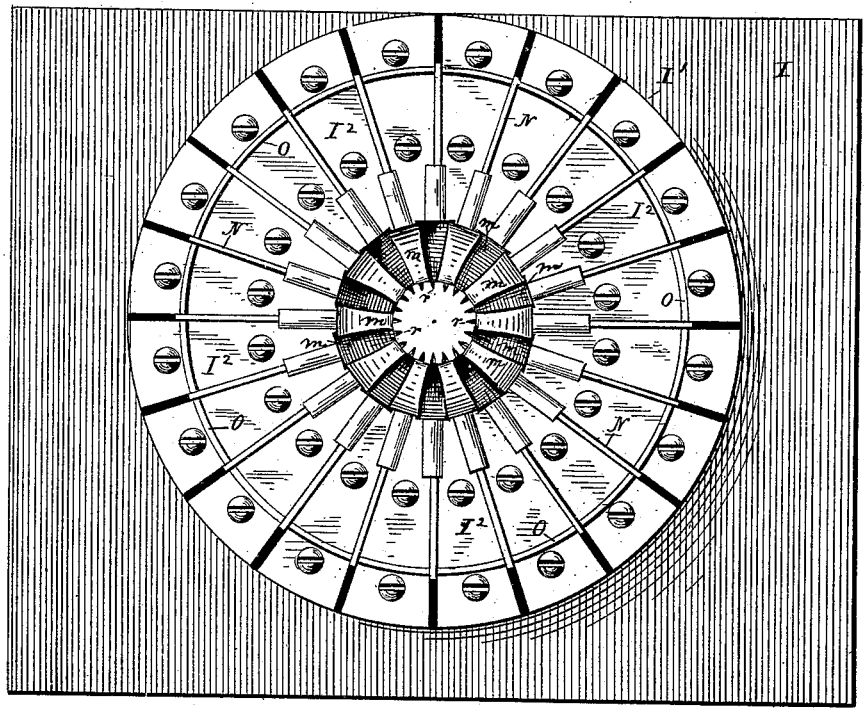
Figure 6:
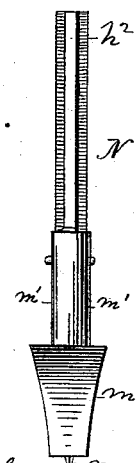
Figure 7:
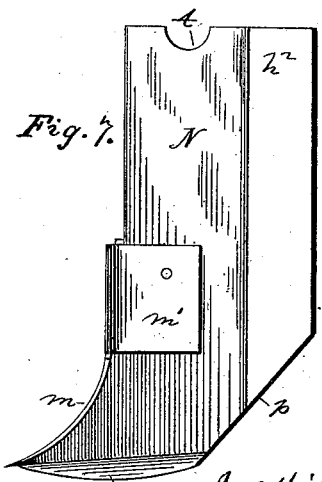

Figure 1 is a top or plan view of the entire machine. Fig. 2 is a cross-section of the same through the line $x\,x$. Fig. 3 is a cross-section through the line $y\,y$, the view being on a larger scale. Fig. 4 is a vertical longitudinal section through the working parts of the machine, shown on a still larger scale. Fig. 5 is a face view, on a still larger scale, of the series of knives. Figs. 6 and 7 are further enlarged views of one of the knives, and Fig. 8 is a longitudinal section of the plunger.

My invention relates to an improvement upon the machine for cutting green corn from the cob for which I have already made application for a patent, which application was filed July 15, 1882. In that machine there was combined a circular series of radially-sliding knives, a continuous spring encompassing the same, a tapering segmental feeding-throat arranged in front of the knives and loosely connected with the same, so as to adjust them to the varying sizes of cob, a brush arranged in front of the feeding-throat, a trough arranged in front of the brush, and a trough and plunger, with driving mechanism for driving the ears of corn through.

My present invention consists of the improved construction of the knives; in the combination of the same with the frame-plate in which they slide; in the improved construction and arrangement of the plunger, and in the combination, with the plunger-trough, of an automatic feeding device for delivering the ears of corn one by one to the plunger, as will be hereinafter more fully described and claimed.

In the drawings, A represents the main frame, supported upon legs B.

C is the main drive-wheel, having a pin, $a$, that plays in the slotted cross-head D, which cross-head is attached to and operates the plunger E. This plunger passes through the cross-bar F, and has a head, E', that strikes against the ear of corn as it lies in the trough H and forces it through the brush-tube L, tapering expansible segmental throat J J', and the knives, the cut corn falling into the hopper G and the cob into the chute $b$.

As so far described the machine does not differ substantially from that described in my previous application for a patent referred to.

In constructing the plunger E, I form on the end of it a cushion, $c$, of leather, rubber, or other soft material, which is slightly larger than this end of the plunger; and behind this cushion I place a loose metallic ring or head, E'; and back of this head is placed a spiral spring, $E^2$, which at its rear end bears against a shoulder on the plunger, and at its front end bears against the metallic annular head E'. This head is also connected to the plunger, so that it cannot turn, by a set-screw, $d$, that enters a longitudinal groove in the plunger. Said head has also a recess in its face, into which the cushion $c$ passes, and is flush therewith, and is provided, furthermore, with diametrical pins or lugs, $e\,e$. (See Fig. 1.) The object of this construction is as follows:

The cushion $c$, against which the principal strain comes, obviates the splitting of the cob, which I have found to occur when the small end of the plunger is made of metal. This cushion being of greater diameter than the plunger-rod, it laps over onto the solid outer periphery of the cob, which can stand the strain thus distributed upon it, instead of allowing the small plunger-rod to bury into the pithy central part of the cob, which involves the splitting of the end and the glancing off of the plunger. This cushion also being of greater diameter than the plunger-rod, it serves to hold the head E' on the plunger-rod. The loose spring-seated head E' serves to centralize the plunger against the ear of corn, and gives a better bearing, and as this head is too large to be forced through the series of knives, whose diameter is just large enough for the cob, the spring-seated character of said head permits it to stop in the tapering throat J J', while the small cushioned end of the plunger passes farther on and forces the ear of corn through the series of knives.

Just here may be understood the function of the pins or lugs e e on the head, for these enter grooves f f, Fig. 4, in the side segments of the tapering throat, which grooves stop near the small end of the throat and limit the further movement of the lugs or pins e e, and thus hold the head while the cushioned end of the plunger moves on. When the plunger is retracted the spring holds the head E' out to the end of the plunger for the next movement.

For feeding the corn automatically to the trough H, I have provided an inclined chute, P, in an opening in which there is placed a shaft, Q, with four wings, g. This shaft is given an intermittent rotary movement, and its wings take between them, from the ears of corn lying above, one ear at a time, and at every quarter-revolution of the shaft deposit one in the trough. For giving this intermittent revolution to the shaft Q, a ratchet-wheel, R, is fixed on the same, and a vibrating lever, S, with a pawl, h, is loosely hung on said shaft, beside said ratchet, and with the pawl resting in the plane of the same. The lower end of the lever has formed upon it the circular segment of a toothed bevel-wheel, i, which engages with a horizontal toothed segment, j, to which are attached two arms, k l, which are alternately struck by the plunger. Now, when the plunger moves back, its head strikes the arm k, and by rotating gears i j throws the pawl forward on the ratchet-wheel, and by turning the same and its shaft Q also turns the corn-receiver and deposits an ear of corn in the trough. As the plunger moves forward a pin on the same strikes the other arm, l, and by rotating gears i j in the opposite direction throws the lever and its pawl back on the ratchet-wheel for a new position, ready to discharge another ear at the proper time.

In constructing and arranging the knives N m they are arranged in a plate, I, which is cast with a central hole and a raised circular boss, I', Figs. 1 and 4, around the same. Radially in this raised boss are cut the channels which receive the ribs $h^2$ of the knife-plates. Over the edges of these ribs, and upon the face of the boss I', are screwed plates $I^2$, which hold the knives against falling out, but allow them to move freely in radial lines. These knife-plates have their outer edges curved, and upon these curved edges, and bearing there against throughout their length, are arranged the chisel-shaped cutters m, whose planes are at right angles to the planes of the knife-plates. An advantage belonging to this construction of knife is that in this radially-moving knife-plate the strain of cutting is at right angles to the length of the plate, and the curved abutment of the plate beneath the cutters braces and strengthens the thin steel cutters and enables them to resist this strain without vibration or chattering. These knife-plates have also in the rear of the cutters sharp bearing-edges r at right angles to the cutting-edges of the knife, which edges r approach to the center of the series of knives a little closer than the cutting-edges m (see Fig. 5) and bear against the cob. These edges r are made just sharp enough to cut through the soft stubs of the cut corn grains, but not sharp enough to enter the cob, and their function is to give the knives a bearing against the cob to allow them independent adjustment; but by their sharpness they are prevented from riding up on the cut stubs of the grain, and thus throwing the knives out to a constantly-increasing diameter.

The curved chisel-shaped cutters m have ears m' m', that lap over the knife-plate N, and are fastened thereto by a rivet, which constitutes an easy method of rendering the cutters detachable from the plate. Said plates have also a notch, t, in their ends, in which is sprung an endless spring, O, as in my former case, to draw the knives to the center.

For adjusting the knives outwardly to the size of the cob, the pivoted throat-segments J J' are provided with right-angular arms S, which are connected by links T to a spider-frame, U, in rear of plate I, which spider-frame is attached to a hollow sleeve having a beveled edge at its front end, and which passes through the hole in plate I and bears against a bevel-edge, p, of the knife-plates to press them outwardly whenever said sleeve is drawn forward by the expansion of the throat-sections J J' from a larger ear of corn.

Instead of using two tappet-arms, k l, I may use but one arm, and so arrange it as to be operated by both forward and backward movement of the plunger.

I am aware that a radially-armed and rotary-moving feeding device has been used in connection with a green-corn cutter, and do not claim this, broadly.

Having thus described my invention, what I claim as new is—

1. The circular series of knife-plates N, having their outer or exterior edges curved, as shown and described, and combined with chisel-shaped cutters m, arranged upon these curved edges at right angles to the plane of the plate, and bearing thereon throughout their length, substantially as described.

2. The knife-plate N, having chisel-shaped knife or cutter m and a sharp bearing-edge, r, next to the cob, in rear of the cutter, and approaching closer to the center than the cutters, as and for the purpose described.

3. The knife-plate N, having notch t, rib $h^2$, and sharp bearing r for the cob, in rear of the knife, combined with cutter m, and approaching the center more closely than said cutter, substantially as shown and described.

4. The combination, with the trough of the corn-cutter, of the inclined chute P, shaft Q, with corn-receivers, ratchet-wheel R', lever S, with pawl h and toothed segment i, the toothed segment j, with one or more arms, k l, and the plunger of the cutter, substantially as shown and described.

5. The combination, with the corn-cutting devices, of a plunger having an elastic pad or cushion on its end of larger size than the plunger-rod, and firmly attached to it, whereby said cushion or pad is made to give a bearing against the outer hard periphery of the cob, and the plunger-rod is prevented from bursting the cob by burying in its central pithy portion, as described.

6. The combination, with the corn-cutting devices, of the plunger E, having a cushioned end, c, of larger diameter than the end of the plunger-rod, loose head E', and the spiral spring arranged behind the same, as and for the purpose described.

7. The combination, with the corn-cutting devices and the tapering throat having grooves $f'f$, of the plunger having loose head E', with guide and stop lugs $e\,e$ and a spring in the rear of the same, as and for the purpose described.

8. The combination of the frame I, having a hole in its middle and a raised boss, I', around it, with radial grooves cut in the same, of the detachable plates I$^2$ and the radially-sliding knives, having ribs $h'$ sliding in said grooves, as shown and described.

JOHN WILSON BROWN, JR.

Witnesses:
FELIX R. SULLIVAN,
T. T. HUTCHINS.